UNITED STATES PATENT OFFICE.

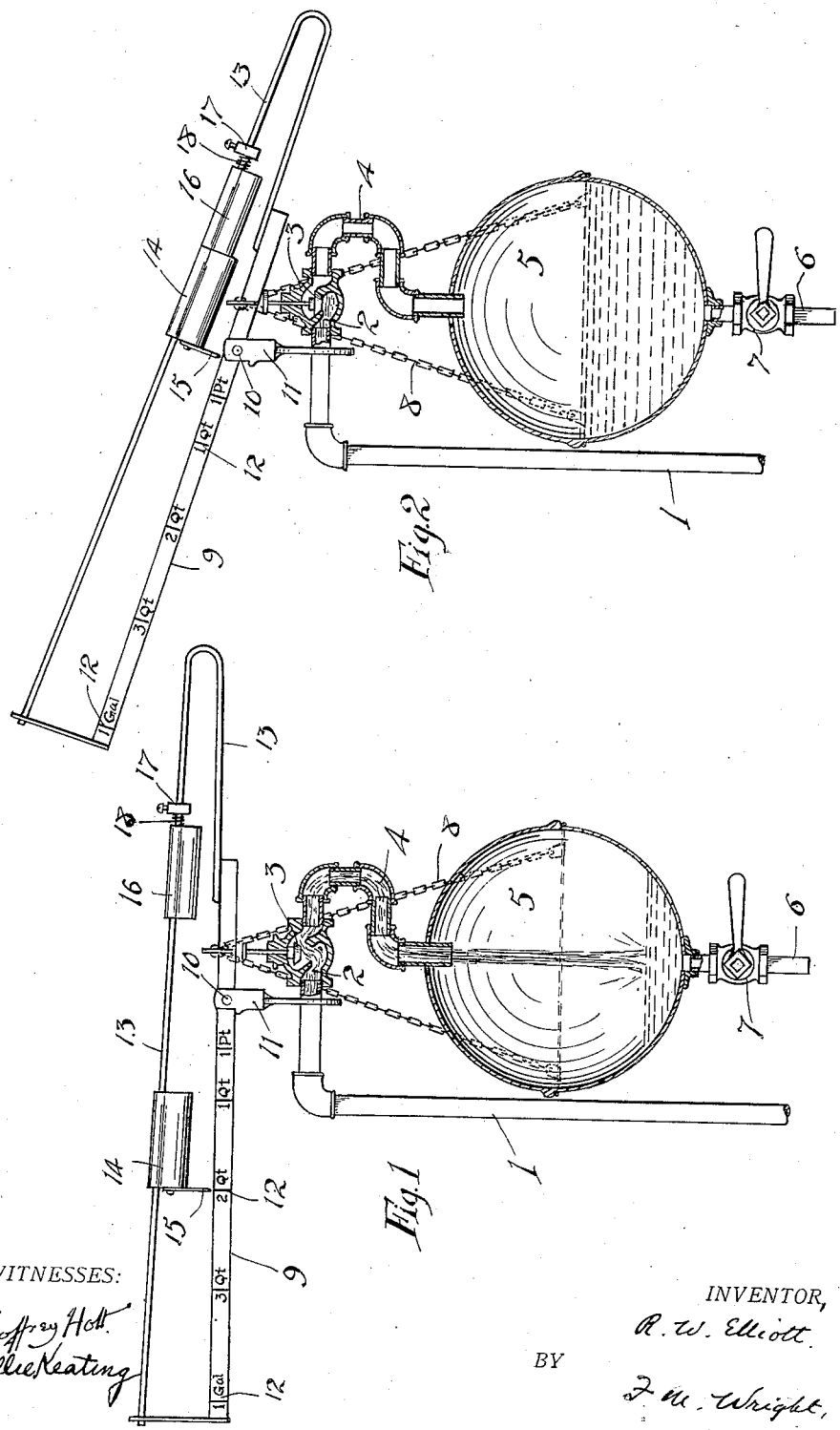

RALPH W. ELLIOTT, OF ANTIOCH, CALIFORNIA.

LIQUID-DISPENSING APPARATUS.

No. 897,359.  Specification of Letters Patent.  Patented Sept. 1, 1908.

Application filed January 23, 1908. Serial No. 412,246.

*To all whom it may concern:*

Be it known that I, RALPH W. ELLIOTT, a citizen of the United States, residing at Antioch, in the county of Contra Costa and State of California, have invented new and useful Improvements in Liquid-Dispensing Apparatus, of which the following is a specification.

The object of the present invention is to provide a convenient, rapid, and accurate apparatus for measuring liquids, when dispensing the same for sale or for other purposes.

In the accompanying drawing, Figure 1 is a side view of the apparatus, partly in vertical section, showing the parts in the position in which the liquid is being measured, and Fig. 2 is a similar view showing the parts in the position when the measurement has been completed.

Referring to the drawing, 1 indicates a pipe up which the liquid is forced by a pump or by gravity, as may be found convenient. From this pipe the liquid passes through a valve opening 2, controlled by a valve 3, and thence to a pipe 4, the lower end of which is open, and from which the liquid drops into a receptacle 5. Extending from the bottom of said receptacle is a pipe 6, controlled by a cock 7, by means of which the liquid may be drawn off from the receptacle. Said receptacle is suspended by means of chains 8 from a scale beam 9, fulcrumed at 10 upon a suitable extension or support 11 secured upon the pipe 1. The long arm of said scale beam is suitably graduated, as shown at 12, to indicate different quantities by volume. However, these graduations may indicate weight, if desired. Above the scale beam is secured a slide rod 13, which extends in the same vertical plane as the scale beam, but is slightly inclined downwards towards its short arm. Upon said slide rod can slide a weight 14, which has a downwardly extending pointer 15. At the end of its sliding movement the weight impinges against a weight 16 upon the slide rod, between which weight and a stop 17 adjustably secured upon the slide rod is interposed a spring 18. When the scale beam is tilted, its descending short arm depresses the head 19 of the valve 3, and closes said valve, preventing the passage of any liquid from the pipe 1 into the receptacle.

The apparatus is used in the following manner: The stop cock 7 being closed, the weight 14 is moved along the slide bar to bring the pointer opposite to the mark indicating the quantity of liquid which it is desired to dispense, as, for instance, ½ gallon. The scale beam is now level and the valve 3 is therefore open. This allows the liquid to flow into the receptacle, and it continues to so flow until such a weight thereof has entered the receptacle as will counterbalance the weight 14 at the point at which it has been placed. As soon as the weight of the receptacle is sufficient to overcome the weight, the receptacle falls, thereby tilting the scale beam and closing the valve 3, preventing the passage of any further liquid. The liquid can then be withdrawn from the receptacle by opening the stop cock. After the liquid has been all drawn off, the stop cock is closed and the apparatus is again ready for use.

The weight 16 serves two purposes. It acts as a buffer to yieldingly receive the impact of the weight 14 at the end of its sliding movement, but its principal object is for the purpose of adjustment of the scale beam for liquids of different specific gravity. It is evident that when measuring liquids by volume, since the scale beam is tilted by the weight of the liquid supplied to the receptacle, means should be provided for adjusting the scale beam to correspond with the differences in the weights of liquids of varying specific gravities. Provision is made for this purpose by means of the weight 16, which can be adjusted to any desired point upon the slide rod.

I claim:—

1. In an apparatus of the character described, the combination of a receptacle, means for supplying material thereto, a valve for controlling said supply means, a scale beam provided with a slideway, the receptacle being supported on said scale beam at one side of its fulcrum, a counterbalance weight, slidably supported on said slideway, and means whereby the movement of the scale beam controls said valve, substantially as described.

2. In an apparatus of the character described, the combination of a scale beam, a receptacle attached to said scale beam, a slide rod secured to said scale beam, and inclined thereto, a weight slidable upon said rod and having a pointer directed towards said scale beam, means for supplying material to said receptacle, a valve controlling said means, and means whereby the movement of the scale beam controls said valve, substantially as described.

3. In an apparatus of the character described, the combination of a scale beam, a receptacle attached thereto, a pipe for drawing off liquid from the receptacle, a stopcock for the latter pipe, a pipe for supplying the liquid to the receptacle, a valve for controlling said latter pipe, a slide rod connected to said scale beam, a weight slidable on said rod, said scale beam contacting with the valve to control the liquid supply and close the same when the scale beam is tilted, substantially as described.

4. In an apparatus of the character described, the combination of a scale beam, a receptacle attached thereto, a pipe for drawing off liquid from the receptacle, a stopcock for the latter pipe, a pipe for supplying the liquid to the receptacle, a valve for controlling said latter pipe, a slide bar connected to said scale beam, a weight slidable on said rod, having a pointer directed towards said scale beam, said scale beam contacting with the valve to control the liquid supply and close the same when the scale beam is tilted, substantially as described.

5. In an apparatus of the character described, the combination of a scale beam, a receptacle attached thereto, a pipe for drawing off liquid from the receptacle, a stopcock for the latter pipe, a pipe for supplying the liquid to the receptacle, a valve for controlling said latter pipe, a slide bar connected to said scale beam, a weight slidable on said rod, a spring-controlled buffer against which the weight can impinge at the end of its sliding movement, said scale beam contacting with the valve to control the liquid supply and close the same when the scale beam is tilted, substantially as described.

6. In an apparatus of the character described, the combination of a scale beam having a slideway, a receptacle supported by said scale beam, means for supplying a material thereto, a valve for controlling said supply, a counterbalance weight slidable on said slideway, means whereby the movement of the scale beam controls said valve, and an adjusting weight, adjustably supported by the scale beam, to adjust the same for varying specific gravities, substantially as described.

7. In an apparatus of the character described, the combination of a scale beam, a receptacle attached thereto to oscillate said scale beam by its weight and the weight of its contents, a movable counterbalance weight upon said scale beam, means for supplying material to said receptacle, a valve arranged to close said supply, means actuated by the tilting of the scale beam to close said valve, an adjusting weight, and means for adjustably and resiliently supporting said weight in the path of the movable weight, to be impinged upon by the latter at the end of its movement upon the tilting of the scale beam, substantially as described.

In testimony whereof I have hereunto set my hand in the presence of two subscribing witnesses.

RALPH W. ELLIOTT.

Witnesses:
FRANCIS M. WRIGHT,
D. B. RICHARDS.